United States Patent
Ma

(10) Patent No.: US 10,596,889 B2
(45) Date of Patent: Mar. 24, 2020

(54) TONNEAU COVER AND CLAMP ASSEMBLY

(71) Applicant: Winbo-Dongjian Automotive Technology Co. Ltd., Foshan (CN)

(72) Inventor: Yongtao Ma, Foshan (CN)

(73) Assignee: Winbo-Dongjian Automative Technology Co. Ltd., Foshan (CN)

( * ) Notice: Subject to any disclaimer, the term of this patent is extended or adjusted under 35 U.S.C. 154(b) by 100 days.

(21) Appl. No.: 15/928,464

(22) Filed: Mar. 22, 2018

(65) Prior Publication Data

US 2019/0291553 A1 Sep. 26, 2019

(51) Int. Cl.
*B60J 7/19* (2006.01)
*B60J 7/14* (2006.01)

(52) U.S. Cl.
CPC .............. *B60J 7/198* (2013.01); *B60J 7/141* (2013.01)

(58) Field of Classification Search
CPC .................................. B60J 7/198; B60J 7/141
See application file for complete search history.

(56) References Cited

U.S. PATENT DOCUMENTS

| | | | |
|---|---|---|---|
| 3,662,435 A | 5/1972 | Allsop | |
| 7,188,888 B2 | 3/2007 | Wheatley et al. | |
| 7,334,830 B2 | 2/2008 | Weldy | |
| 8,205,928 B2 | 6/2012 | Steffens et al. | |
| 8,256,824 B2 | 9/2012 | Williamson et al. | |
| 9,290,122 B2 | 3/2016 | Spencer | |
| 9,487,071 B1* | 11/2016 | Yue | B60J 7/141 |
| 9,533,555 B2 | 1/2017 | Facchinello et al. | |
| 9,545,835 B2 | 1/2017 | Facchinello et al. | |
| 9,630,479 B2 | 4/2017 | Facchinello et al. | |
| 9,669,689 B2 | 6/2017 | Steffens et al. | |
| 2017/0197498 A1* | 7/2017 | Facchinello | B60J 7/198 |
| 2019/0118629 A1* | 4/2019 | Spencer | B60J 7/04 |

* cited by examiner

*Primary Examiner* — Lori L Lyjak
(74) *Attorney, Agent, or Firm* — Eric J. Sosenko; Jonathan P. O'Brien; Honigman LLP

(57) ABSTRACT

A tonneau cover for covering a cargo box of a pickup truck. The tonneau cover including a cover assembly for covering the cargo box and at least one clamp assembly secured to the cover assembly for securing the tonneau cover to the cargo box. The clamp assembly includes an elongated strap, and a clamp mechanism that is in sliding engagement with the strap between a series of secured positions along the strap. The clamp mechanism includes a clamp that is engageable with the cargo box and a pawl is supported by the clamp and biased into engagement with the strap, or more particularly teeth provided on the strap. A release is also supported by the clamp and by pulling on the release the pawl is disengaged from the strap, allowing the clamp to be slid along the strap.

20 Claims, 6 Drawing Sheets

TONNEAU COVER AND CLAMP ASSEMBLY

BACKGROUND

1. Field of the Invention

The present invention generally relates to tonneau covers. More specifically, the invention relates to a clamp assembly for selectively securing the tonneau cover to the cargo box of a pickup truck.

2. Description of Related Art

Tonneau covers are well known for covering the cargo boxes of pickup trucks to protect the contents of the cargo box from environmental factors and to enhance the aesthetics of the pickup truck. Generally, tonneau covers are movable so as to selectively close off or provide access to the cargo box, without requiring complete removal of the tonneau cover. In this regard, the tonneau covers are typically of the roll-up variety or the foldable variety.

Regarding the foldable variety, these tonneau covers typically include a frame disposed about the upper surfaces of the side and end rails of the cargo box with transverse rails extending between the side rails. One or more hinged connections are provided in the frame to allow the frame to fold upon itself. This folding may be in multiple directions, but is typically in a direction from the tailgate toward the cab of the pickup truck.

To cover the open areas between the various frame members of the tonneau cover, the tonneau cover may be provided with a flexible cover extending over the entire frame. This is generally known as a soft-top tonneau cover. Alternatively, the tonneau cover may be provided with individual rigid panels between the various frame members. This is often referred to as a hardtop tonneau cover. In either instance, a clamp assembly toward the rear of the tonneau cover, (generally adjacent to the tailgate) needs to be provided to quickly and easily engage with and disengage from the side rail of the cargo box, thereby providing quick access into or quick closure of the cargo box.

SUMMARY

In satisfying the above need, as well as overcoming the enumerated drawbacks and other limitations of the related art, the present invention provides a tonneau cover for covering the cargo box of a pickup truck that can be clamped to the cargo box without ever tightening of the clamp assembly, potentially causing improperly deforming the seals engaged with the upper surfaces of the cargo box, and that can be quickly and easily released to disengage at least a portion of the tonneau cover from the cargo box.

Accordingly, in one aspect the present invention provides a tonneau cover for covering a cargo box of a pickup truck, the tonneau cover comprising: a cover assembly configured to cover the cargo box of the pickup truck; and at least one clamp assembly secured to the cover assembly, the clamp assembly comprising an elongated strap, and a clamp mechanism in sliding engagement with the strap and movable between a plurality of secured positions along the strap, the clamp mechanism including a clamp configured for engagement with the cargo box of the pickup truck, a pawl pivotally supported by the clamp and spaced apart from a portion of the clamp, the strap extending between the portion of the clamp and the pawl, and an end of the pawl being biased into engagement with the strap, and a release member pivotally supported by the clamp and moveable between released position and an unreleased position, in the released position the release member being coupled to the pawl and the pawl being disengaged from the strap, in the unreleased position the pawl being engaged with the strap.

In another aspect, a channel extends from a side edge of the cover assembly and the clamp assembly is pivotally secured to the cover assembly in the channel and movable between a stowed position retained within the channel and a position depending from the channel.

In a further aspect, the clamp assembly includes a slide received within the channel, the slide being secured in one of a plurality of positions within the channel.

An additional aspect, the slide is fixedly secured within the channel.

In yet another aspect, a pivot pin pivotally mounting the strap to the slide.

In still a further aspect, the cover assembly includes a plurality of rigid panels and the channel is a recess channel within at least one of the rigid panels.

According to it an additional aspect, a retainer clip slideably received within the channel, the retainer clip having a transverse portion extending between opposing sides of the channel and being spaced apart from a bottom wall of the channel, the retainer clip being slideable to a position over the strap when the clamp assembly is in the stowed position.

In another aspect, the clamp mechanism includes an engagement lever, the engagement lever being pivotally supported by the clamp, the engagement lever including an engagement feature configured to engage the strap, the engagement lever being movable between first and second positions whereby during movement from the first position to the second position the engagement feature is rotated into engagement with the strap and causes the strap to move through the clamp.

In yet a further aspect, the engagement features includes at least one rib.

Still in an additional aspect, the at least one rib extends parallel to an axis of rotation of the engagement lever.

In another aspect, the engagement lever pivotally supported by a carrier at a first end of the carrier and the carrier is pivotally supported by the clamp the second end of the carrier.

In a further aspect, the carrier is coupled to the release member and is pivoted relative to the clamp by the release member during movement from the unreleased position to released position.

In an additional aspect, the engagement lever is coupled to the release member and is pivoted relative to the clamp by the release member during movement from the unreleased position to the released position.

In still another aspect, the engagement lever is biased into the first position.

In yet a further aspect, the strap includes a plurality of teeth disposed along a length of the strap, the teeth being oriented transverse to the length of the strap.

An additional aspect, the cover assembly includes a plurality of rigid panels, the rigid panels being pivotally connected to one another, and wherein two of the clamp assemblies are secured to at least one of the rigid panels.

According to another aspect of the invention, a tonneau cover for covering a cargo box of a pickup truck is provided comprising: a cover assembly configured to cover the cargo box of the pickup truck; and at least one clamp assembly secured to the cover assembly, the clamp assembly comprising an elongated strap, and a clamp mechanism slideable along the strap between a plurality of secured positions, the clamp mechanism including a clamp configured for engagement with the cargo box of the pickup truck, a ratchet mechanism for advancing the clamp mechanism in a first direction along the strap between the plurality of secured positions to engage the clamp with the cargo box of the pickup truck, and a release mechanism for disengaging the ratchet mechanism from the strap and allowing movement of the clamp mechanism in a second direction along the strap, the second direction being opposite of the first direction.

In a further aspect, an actuating member of the ratchet mechanism is pulled in a direction away from the cover assembly to engage the clamp with the cargo box of the pickup truck.

According to an additional aspect, an actuating member of the release mechanism is pulled in a direction away from the cover assembly to disengage the ratchet mechanism from the strap.

In another aspect, the clamp mechanism is manually slideable along the strap toward the cover assembly.

Further objects, features and advantages of this invention will become readily apparent to persons skilled in the art after review of the following description with reference to the drawings and the claims that are appended to and form a part of this specification.

DETAILED DESCRIPTION

As used in the description that follows, directional terms such as "upper" and "lower" are used with reference to the orientation of the elements as presented in the figures. Accordingly, "upper" indicates a direction toward the top of the figure and "lower" indicates a direction toward the bottom of the figure. The terms "left" and "right" are similarly interpreted. The terms "inward" or "inner" and "outward" or "outer" indicate a direction that is generally toward or away from a central axis of the referred to part whether or not such an access is designated in the figures. An axial surface is therefore one that faces in the axial direction. In other words, an axial surface faces in a direction along the central axis. A radial surface therefore faces radially, generally away from or toward the central axis. It will be understood, however, that in actual implementation, the directional references used herein may not necessarily correspond with the installation and orientation of the corresponding components or device.

Figure 1:
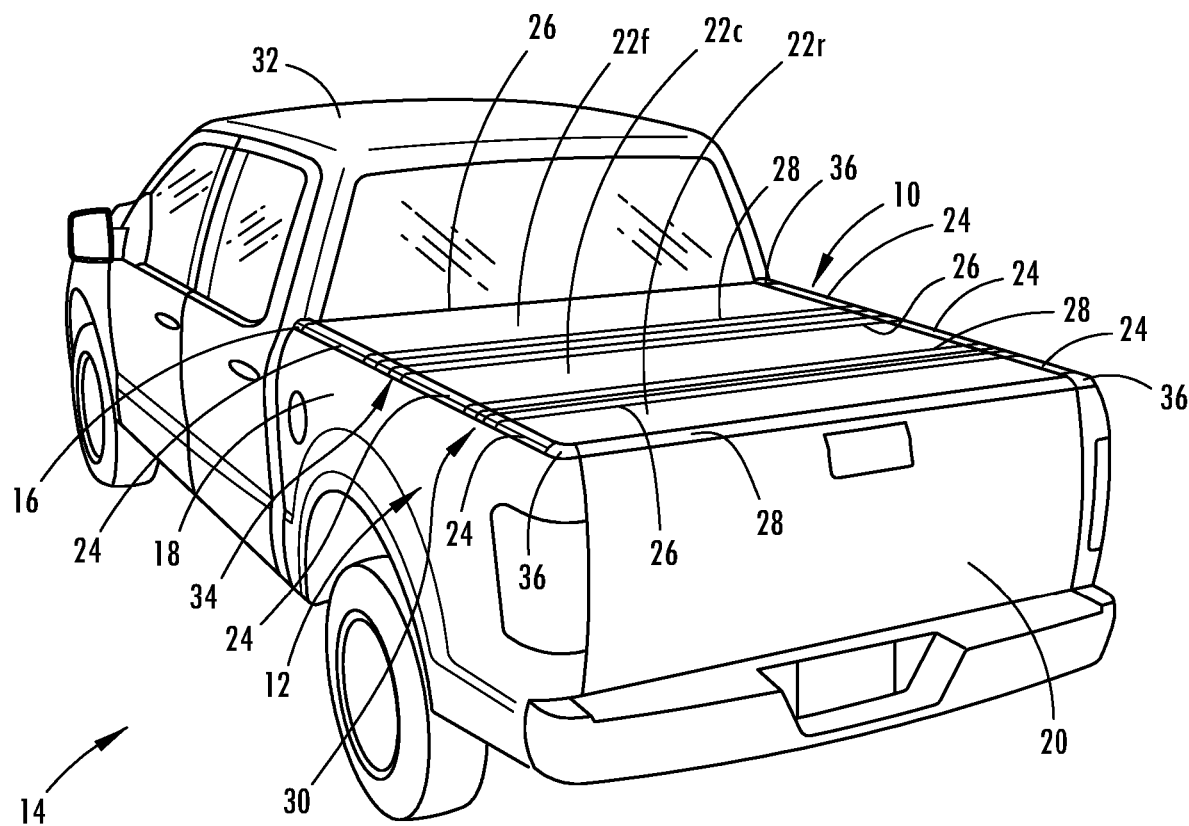
FIG. 1 is a perspective view of a pickup truck with tonneau cover embodying the principles of the present invention over the bed or cargo box of the pickup truck.

Referring now to the drawings, a tonneau cover is shown therein and designated at 10. The tonneau cover 10 is typically used to cover the bed or cargo box 12 of a pickup truck 14 and is of the folding, hardtop variety. As seen in FIG. 1, the tonneau cover 10 is disposed on the upper surfaces 16 of the sidewalls 18, including the tailgate 20, that define the cargo box 12 of the pickup truck 14.

Figure 2:
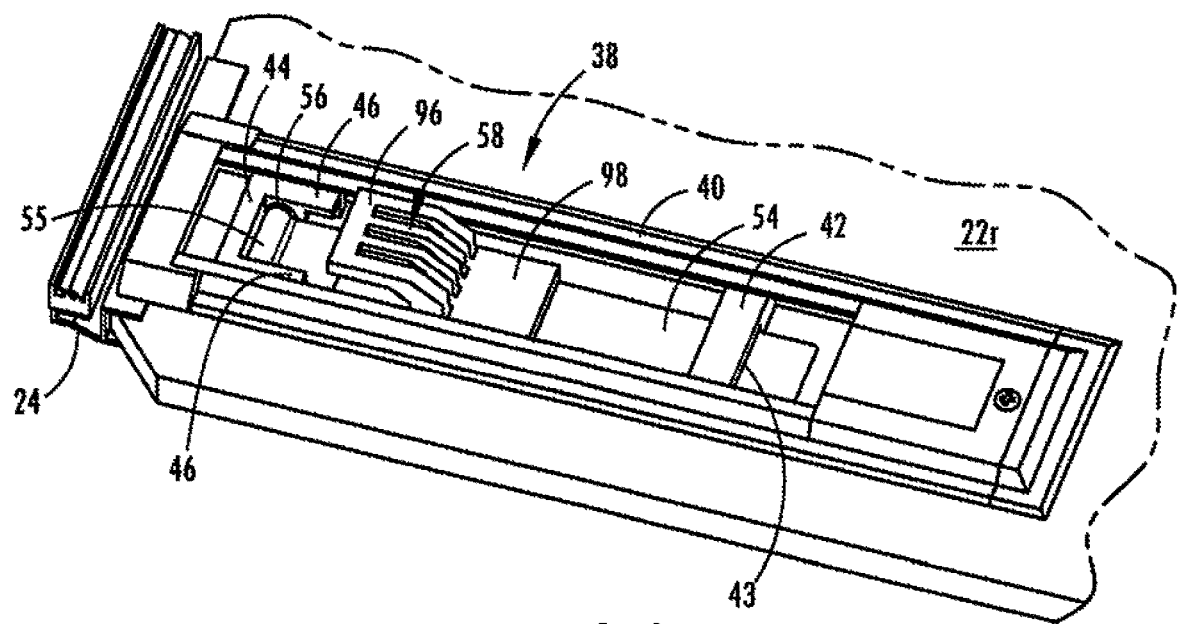
FIG. 2 is bottom perspective view of the tonneau cover seen in FIG. 1 and illustrating a clamp assembly in the stowed position.

The tonneau cover 10 includes a plurality of individual panels 22, each of which has a substantially rectangular configuration. As illustrated, the tonneau cover 10 is a tri-fold tonneau cover, meaning that it is comprised of three panels 22 that are foldable over one another so as to selectively cover some or substantially all of the cargo box 12. As referred to herein, panel 22r is the first, rear or tailgate-end panel; panel 22c is the second, center or middle panel; and panel 22f is the third, front or cab-end panel of the tonneau cover 10. The tonneau cover 10, as seen in FIGS. 1 and 2, is fully unfolded and in its fully extended position. In this position, the tonneau cover 10 fully or substantially covers the opening of the cargo box 12.

In the folded position, the rear panel 22r is folded onto the center panel 22c, and then both of those panels 22r, 22c can be folded on the front panel 22f. Since the folding capability of the tonneau cover 10 is not the particular focus of the present invention, the folded position of the tonneau cover 10 is not illustrated herein. Notwithstanding this, in the interest of completeness, general aspects of the tonneau cover 10 are discussed and described below.

As noted above, the panels 22 are rigid structures and, accordingly, may be formed as composite structures through a variety of techniques that are well known to those skilled in this technological field. For example, the panels 22 may be comprised of solid upper and lower sheets of aluminum, between which an extruded polystyrene foam sheet core is provided. Since the particular construction of the panels 22 will vary based on the individual preferences of the manufacturer and the particular design criteria for the tonneau cover, further details regarding the specific construction of the panels 22 themselves is not provided herein.

Each panel 22 is bounded about its perimeter by a series of frame members, including a pair of lateral side frame members 24, a front frame member 26 and a rear frame member 28. For the rear panel 22r, the rear frame member 28 is arranged to cooperate with the upper surface of the tailgate 20 and the front frame member 26 may form part of a rear hinge assembly 30. For the front panel 22f, the front frame member 26 is arranged to cooperate with the front side rail (not shown) of the cargo box 12, adjacent to the cab 32 of the pickup truck 14, while its rear frame member 28 may form part of a front hinge assembly 34. For the center panel 22c, the rear frame member 28 may form part of the rear hinge assembly 30, while the front frame member 26 may form part of the front hinge assembly 34. The hinge assemblies 30, 34 themselves may be of any of the well know varieties and, accordingly, are not further described herein.

At the corner intersections of the various frame members, corner members 36 interconnect the frame members 24, 26, 28 to one another.

The tonneau cover 10 includes two clamp assemblies, front clamp assembly (not shown) and a rear clamp assembly 38. Front clamp assembly is provided as part of the front panel 22f and secures the front panel 22f to the side rails 18 of the cargo box 12. The rear clamp assemblies 38 are associated with the rear panel 22r and also operate to secure the rear panel 22r the side rails 18 of the cargo box 12. The front clamp assemblies and rear clamp assemblies 38 may have the same or may have different structures. Generally, however, the rear clamp assemblies 38 a greater ease of operation in that it is these clamp assemblies must be disconnected in order for the tonneau cover 10 to be folded. The front clamp assemblies, once installed, can remain installed until tonneau cover 10 needs to be removed. Unless of course, the tonneau cover is designed such that the front panel 22f can be folded rearward, in which case the front clamp assemblies must also be readily and easily engaged and disengaged. In view the above, only the rear clamp assemblies 38 are discussed herein, it being understood that the front clamp assemblies they have the same or a different construction.

Figure 3:
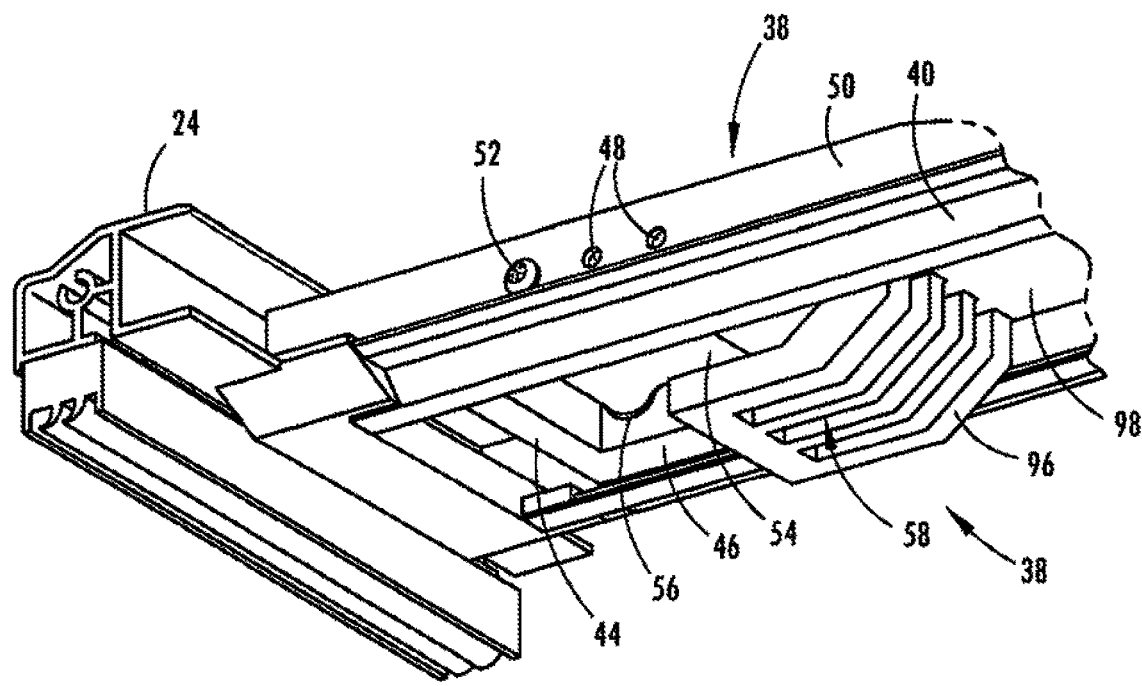
FIG. 3 is an enlarged perspective view of the clamp assembly of FIG. 2 showing a lateral position adjustment feature of the clamp assembly.
Figure 4:
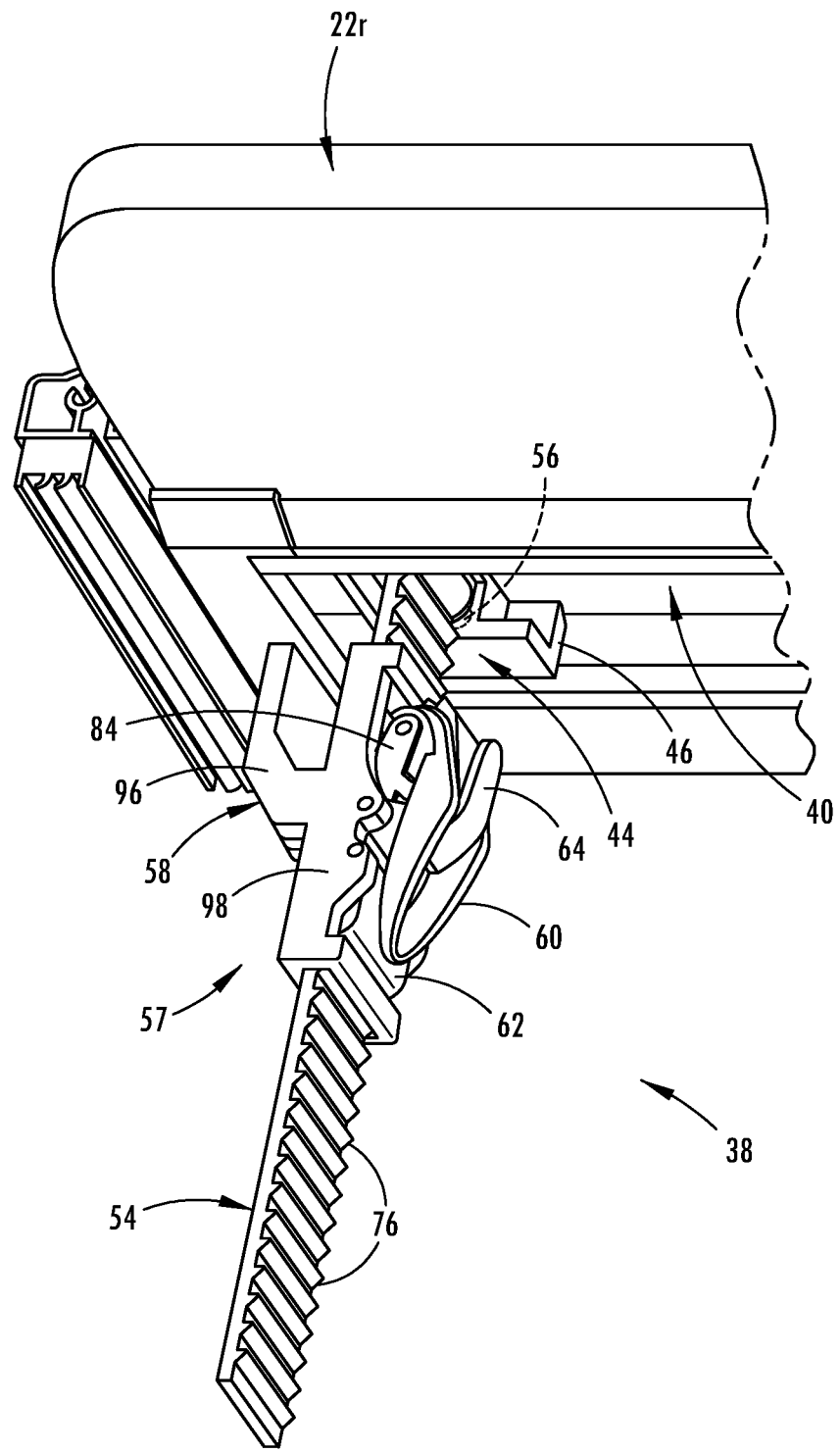
FIG. 4 is an enlarged perspective view of the clamp assembly in the down or use position.

Referring now to FIGS. 2-4, a pair clamp assembly 38 are integrated into the rear panel 22r tonneau cover 10 in opposed positions from one another. More specifically, the each clamp assembly 38 is provided in a recessed channel or pocket 40 that extends laterally inward from the side frame members 24 of the rear panel 22r. The pocket 40 preferably extends only partway across the rear panel 22r, but may be formed as part of a frame member that extends continuously across the rear panel 22r. As seen in FIGS. 2 and 3, the clamp assembly 38 is in a stowed position that facilitates folding of the tonneau cover 10. In this stowed position, the clamp assembly 38 is received within the pocket 40 and only a portion, if any, of the clamp assembly 38 extends out of the pocket 40. Retention of the clamp assembly 38 in the stowed position is achieved by a clip 42 that is slideably retained within the pocket 40 and provided with a recess 43 through which a toothed strap (further discussed below) of the clamp assembly 38 is received.

The clamp assembly 38 includes an upper slide 44 that is also slideably mounted within the pocket 40. Like the clip 42, the slide 44 is shaped on its sides 46 to correspond generally with the side shape of the pocket, thereby allowing the slide 44 to move within the pocket 40. The position of the slide 44 within the pocket 40 can be fixed in one of several locations, each of which is defined by an aperture 48 in the sidewall 50 of the pocket 40.

As best seen in FIG. 3, to fix the position of the slide 44, the slide 44 may be by a screw or other fastener 52 extend through the aperture 48 in the sidewall into the slide 44. Alternatively, the slide 44 may be provided with the detent mechanism in which the button member of the detent mechanism extends into and at least partially through the aperture 48, thereby securing the clamp assembly 38 in position. The various positions of the apertures 48 allow the tonneau cover 10 and clamp assembly 38 accommodate different sidewall thicknesses in different pickup trucks 14. Once the lateral position of the clamp assembly 38 relative to the pocket 40 is set, it no longer needs to be changed or adjusted, so long as the tonneau cover 10 remains on the same pickup truck 14.

When disengaged from the clip 42, the clamp assembly 38 may pivot downward so as to hang substantially vertically from the slide 44 and pocket 40. As previously noted, the clamp assembly 38 includes a toothed strap 54. This strap 54 is engaged with the upper slide 44 by a pivot pin 56 that extends through an enlarged end 55 of the strap 54 and into the sides 46 of the slide 44.

In addition to the toothed strap 54, the clamp assembly 38 also includes a clamp mechanism 57 principally comprised of a clamp 58 and a ratchet mechanism 59, which includes an engagement actuation member or lever 60, a pawl 62 and a release actuation member or lever 64. As further discussed below, through manipulation of the engagement lever 60, the pawl 62 is caused to progressively move up the toothed strap 54, in turn causing clamp 58 to move upward into engagement with the inner flange 66 of the sidewall 18 of the cargo box 12. Conversely, by manipulating the release lever 64, the pawl 62 is released from the toothed strap 54, allowing the clamp 58 to be slid downward and disengage from the inner flange 66 of the sidewall 18 of the cargo box 12.

Figure 5:
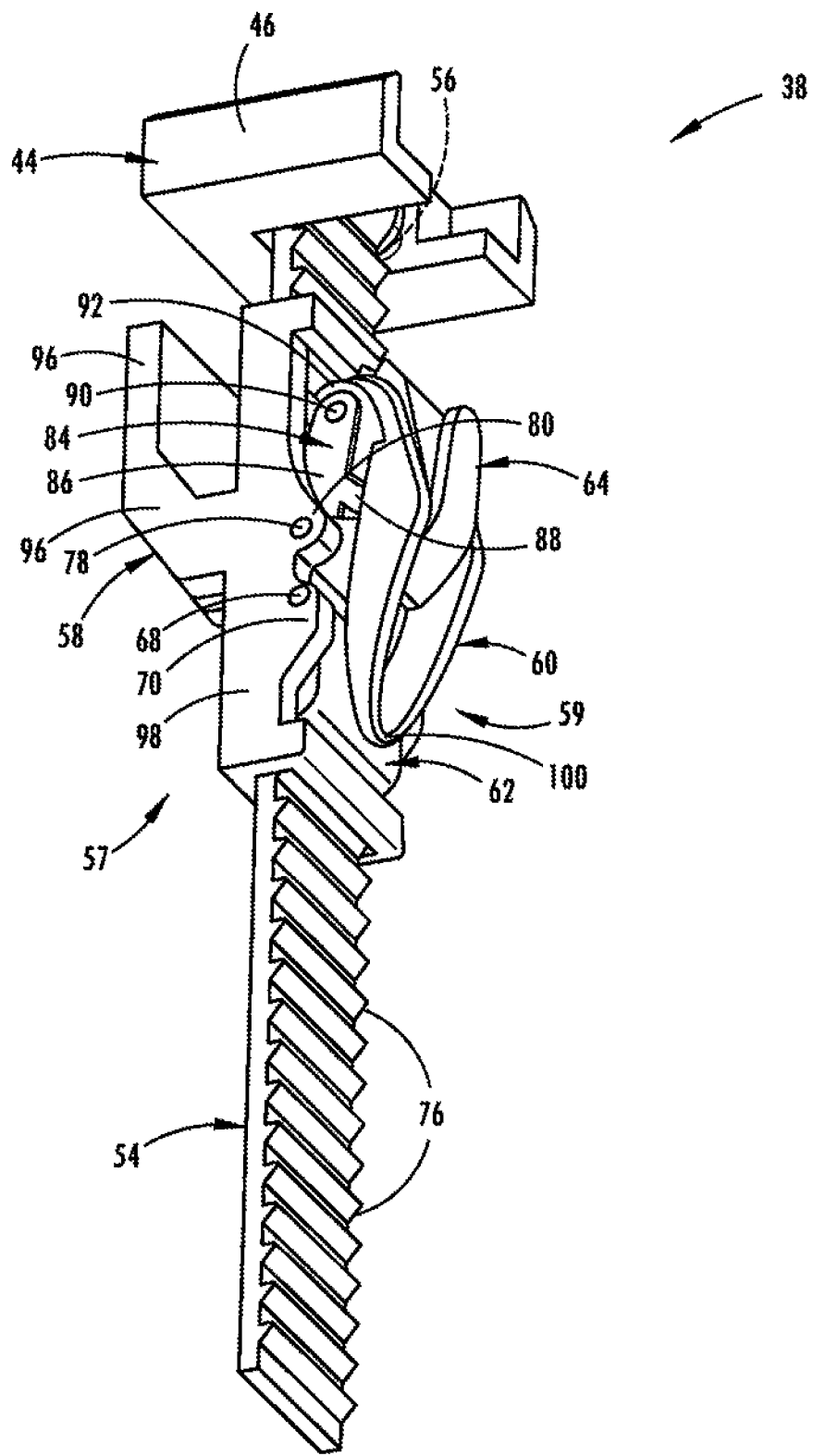
FIG. 5 is an enlarged perspective view similar to that of FIG. 4, but with the clamp assembly apart from the remainder of the tonneau cover.
Figure 6:
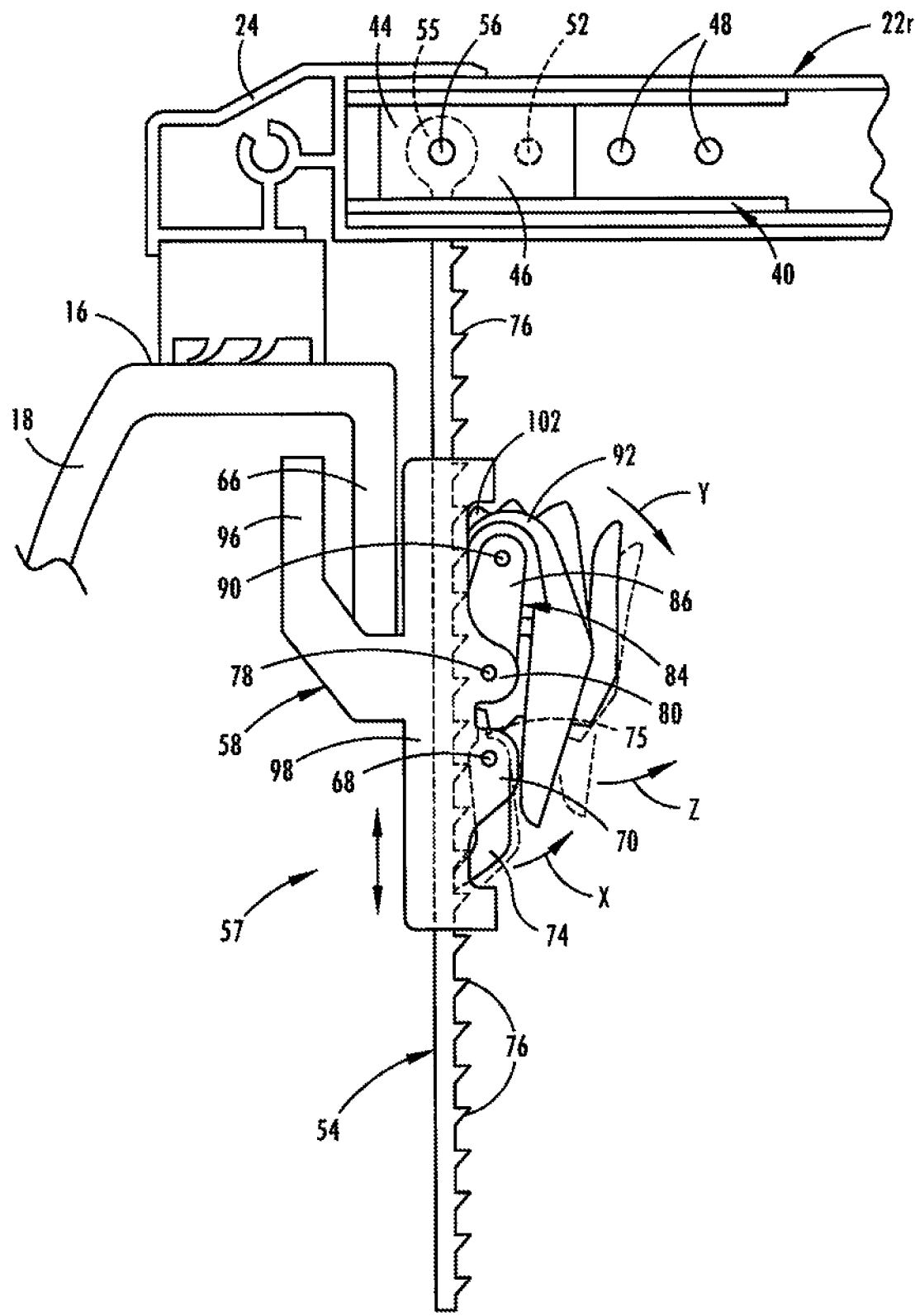
FIG. 6 is a side, partial cross-sectional view of the clamp assembly, cover and cargo box rail of the pickup truck.
Figure 7:
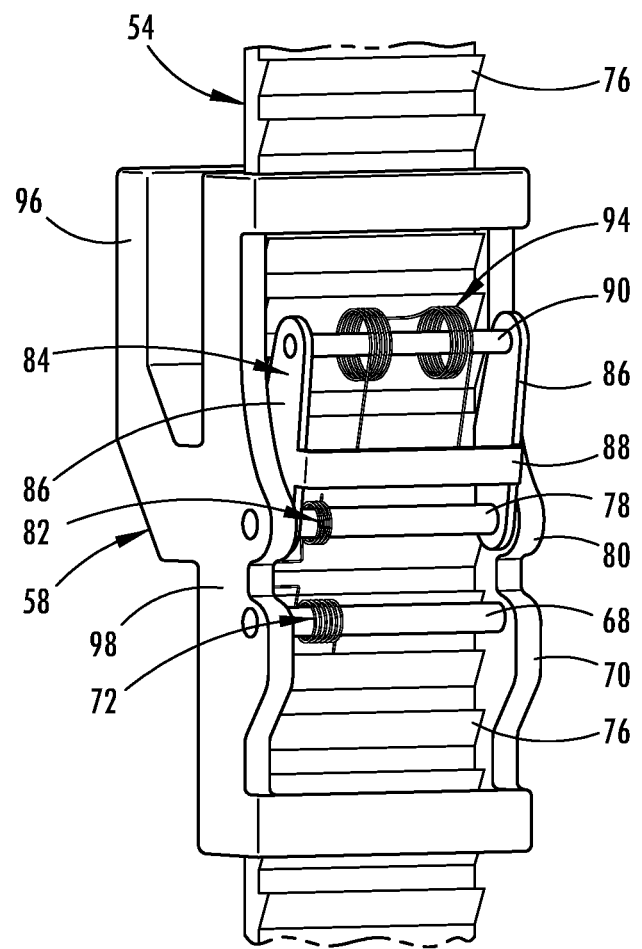
FIG. 7 is an enlarged perspective view of the clamp assembly with the levers and pawl removed.

As seen in FIGS. 5-7, the engagement lever 60, pawl 62 and release lever 64 are all supported by the clamp 58 for their respective movements. This is achieved through a combination of pivot pins and biasing members, particularly torsion springs, associated with each of these elements.

More specifically, the pawl 62 is pivotally supported on the clamp 58 by a pivot pin 68 extended through bosses 70 provided on the clamp 58. A torsion spring 72, also supported by the pivot pin 68, is provided such that the distal end of the pawl 62 is biased in the direction of engagement with the toothed strap 54. As such, the distal end of the pawl 62 is provided with a catch 74 configured to engage with the teeth 76 serially located along the length of the toothed strap 54. The pawl 62 is also provided with a lip 75, on an opposing side of the pivot pin 68 from the catch 74. As further explained below, the lip 75 interacts with the release lever 64 to disengage the catch 74 from the teeth 76 and the strap 54.

The release lever 64 is pivotally supported on the clamp 58 by an additional pivot pin 78, which also extends through bosses 80 of the clamp 58. A second torsion spring 82, supported on the pivot pin 78, interacts between the clamp 58 and the release lever 64 such that release lever 64 is biased out of contact with the pawl 62.

The engagement lever 60 is supported indirectly by the clamp 58 through a carrier 84, which includes opposed side plates 86 interconnected by a bridge 88. The bridge 88 is provided at a location between the ends of the side plates 86 on an upper side thereof. One end of the side plates 86 of the carrier 84 are pivotally supported by the pivot pin 78 that also supports the release lever 64. The opposing ends of the side plates 86 support a third pivot pin 90, which extends through a mounting end 92 of the engagement lever 60. Provided on the pivot pin 90, a third torsion spring 94 biases the engagement lever 60 out of engagement with the toothed strap 54. It is also noted that the second torsion spring 82 cooperates with the release lever 64 to bias the carrier in a direction toward the toothed strap 54.

To engage the clamp assembly 38 with the inner flange 66 of the cargo box sidewall 18, the clamp assembly 38 is first released from the pocket 40 by sliding the clip 42 laterally inward and off of the end of the toothed strap 54. The clamp assembly 38 may then be rotated downwardly, about pivot pin 56, to the position generally seen in FIG. 4. In this position, the catch 74 of the pawl 62 is biased in a direction toward the toothed strap 54, which is a direction opposite of arrow X in FIG. 6. Additionally, in this position the release lever 64 is biased out of engagement with the pawl 62, generally a direction opposite of arrow Y. This biasing of the pawl 62 also operates bias the carrier 84 towards the toothed strap, through reaction of the release lever 64 against the engagement lever 60. Downward movement of the clamp 58 along the strap 54 is therefore precluded by engagement of the catch 74 with the toothed 76 on the strap 54. Upward movement of the clamp 58, however, is permitted in that the torsion spring 72 will allow the pawl 62 to rotate about the pivot pin 56 thereby also allowing the catch 74 to move over and past the next upward tooth 76 along the strap 54. Initially, the clamp 58 is located far enough downward along the strap 54 that a clamping lip 96 of the clamp 58 can move below and outwardly beyond the lowermost edge of the inner flange 66. Thereafter, the clamp 58 may be manually moved upward along the strap 54 until the lower edge of the inner flange 66 contacts the bottom of the channel defined by the clamping lip 96 and a base portion 98 of the clamp 50.

After this initial engagement, the clamp 58 may be secured more tightly against the inner flange 66 through actuation of the engagement lever 60. By lifting a terminal end 100 of the engagement lever 60 in the direction of arrow Z, one or more ribs or teeth 102 on the leading or upper side of the mounting and 92 are rotated into engagement with a tooth 76 on the strap 54 forcing the clamp 58 upward and the catch 74 over the next tooth 76 on the strap 54. This action may then be repeated until the tonneau cover 10 is securely engaged to the sidewall 18.

Disengagement of the clamp assembly 38 occurs by moving the release lever 64 in the direction of arrow Y, which causes the release lever 64 to rotate about pivot pin 78. This movement of the release lever 64 is illustrated in phantom in FIG. 6. By rotating the release lever 64 and the direction of arrow Y, a finger 104 extending from the release lever is brought into contact with the lip 75 of the pawl 62. Further rotation of the release lever 64 causes the pawl 62, through interaction of the finger 104 and the lip 75, to rotate in the direction of arrow X. This movement results in the catch 74 disengaging from the tooth 76 and being moved to a position where the catch 74 is laterally beyond all of the teeth 76 on the strap 54. Additionally, this rotation of the release lever 64 causes a portion of the release lever 64 to act against the bridge 88 and rotate the carrier 84 in the direction of arrow Y. This rotation moves the pivot pin 90, and therefore the engagement lever 60 away from the strap 54. With both the catch 74 the pawl 62 and the tooth 102 of the engagement lever 60 positioned away from the teeth 76 of the strap 54, the clamp 58 may be slid downward along the strap 54 and away from the inner flange 66. Once disengaged, the clamp assembly 38 may be returned to its stowed position by being rotated upwardly into the pocket 40 and secured by the clip 42.

Once the clamp assembly 38 is in the stowed position, the rear panel 22r of the tonneau cover 10 maybe folded about the river hinge assembly 30 and onto the center panel 22c.

As a person skilled in the art will really appreciate, the above description is meant as an illustration of at least one implementation of the principles of the present invention. This description is not intended to limit the scope or application of this invention since the invention is susceptible to modification, variation and change without departing from the spirit of this invention, as defined in the following claims.

I claim:

1. A tonneau cover for covering a cargo box of a pickup truck, the tonneau cover comprising:
    a cover assembly configured to cover the cargo box of the pickup truck; and
    at least one clamp assembly secured to the cover assembly, the clamp assembly comprising
        an elongated strap, and
        a clamp mechanism in sliding engagement with the strap and movable between a plurality of secured positions along the strap, the clamp mechanism including
            a clamp configured for engagement with the cargo box of the pickup truck,
            a pawl pivotally supported by the clamp and spaced apart from a portion of the clamp, the strap extending between the portion of the clamp and the pawl, and an end of the pawl being biased into engagement with the strap, and
            a release member pivotally supported by the clamp and moveable between released position and an unreleased position, in the released position the release member being coupled to the pawl and the pawl being disengaged from the strap, in the unreleased position the pawl being engaged with the strap.

2. The tonneau cover according to claim 1, further comprising a channel extending from a side edge of the cover assembly, the clamp assembly being pivotally secured to the cover assembly in the channel and movable between a stowed position retained within the channel and a position depending from the channel.

3. The tonneau cover according to claim 2, wherein the clamp assembly includes a slide received within the channel, the slide being secured in one of a plurality of positions within the channel.

4. The tonneau cover according to claim 3, wherein the slide is fixedly secured within the channel.

5. The tonneau cover according to claim 3, further comprising a pivot pin pivotally mounting the strap to the slide.

6. The tonneau cover according to claim 2, wherein cover assembly includes a plurality of rigid panels and the channel is a recess channel within at least one of the rigid panels.

7. The tonneau cover according to claim 2, further comprising a retainer clip slideably received within the channel, the retainer clip having a transverse portion extending between opposing sides of the channel and being spaced apart from a bottom wall of the channel, the retainer clip being slideable to a position over the strap when the clamp assembly is in the stowed position.

8. The tonneau cover according to claim 1, wherein the clamp mechanism includes an engagement lever, the engagement lever being pivotally supported by the clamp, the engagement lever including an engagement feature configured to engage the strap, the engagement lever being movable between first and second positions whereby during movement from the first position to the second position the engagement feature is rotated into engagement with the strap and causes the strap to move through the clamp.

9. The tonneau cover according to claim 8, wherein the engagement features includes at least one rib.

10. The tonneau cover according to claim 9, wherein the at least one rib extends parallel to an axis of rotation of the engagement lever.

11. The tonneau cover according to claim 8, wherein the engagement lever pivotally supported by a carrier at a first end of the carrier and the carrier is pivotally supported by the clamp at a second end of the carrier.

12. The tonneau cover according to claim 11, wherein the carrier is coupled to the release member and is pivoted relative to the clamp by the release member during movement from the unreleased position to released position.

13. The tonneau cover according to claim 8, wherein the engagement lever is coupled to the release member and is pivoted relative to the clamp by the release member during movement from the unreleased position to the released position.

14. The tonneau cover according to claim 8, wherein the engagement lever is biased into the first position.

15. The tonneau cover according to claim 1, wherein the strap includes a plurality of teeth disposed along a length of the strap, the teeth being oriented transverse to the length of the strap.

16. The tonneau cover according to claim 1, wherein the cover assembly includes a plurality of rigid panels, the rigid panels being pivotally connected to one another, and wherein two of the clamp assemblies are secured to at least one of the rigid panels.

17. A tonneau cover for covering a cargo box of a pickup truck, the tonneau cover comprising:
a cover assembly configured to cover the cargo box of the pickup truck; and
at least one clamp assembly secured to the cover assembly, the clamp assembly comprising
an elongated strap, and
a clamp mechanism slideable along the strap between a plurality of secured positions, the clamp mechanism including
a clamp configured for engagement with the cargo box of the pickup truck,
a ratchet mechanism for advancing the clamp mechanism in a first direction along the strap between the plurality of secured positions to engage the clamp with the cargo box of the pickup truck, and
a release mechanism for disengaging the ratchet mechanism from the strap and allowing movement of the clamp mechanism in a second direction along the strap, the second direction being opposite of the first direction.

18. The tonneau cover according to claim 17, wherein an actuating member of the ratchet mechanism is pulled in a direction toward the cover assembly to engage the clamp with the cargo box of the pickup truck.

19. The tonneau cover according to claim 18, wherein an actuating member of the release mechanism is pulled in a direction away from the cover assembly to disengage the ratchet mechanism from the strap.

20. The tonneau cover according to claim 18, wherein the clamp mechanism is manually slideable along the strap toward the cover assembly.

* * * * *